Feb. 8, 1927. 1,616,857
A. L. HYDE
APPARATUS FOR VIEWING PICTURES WITH THE ILLUSION OF RELIEF
Filed Feb. 19, 1923
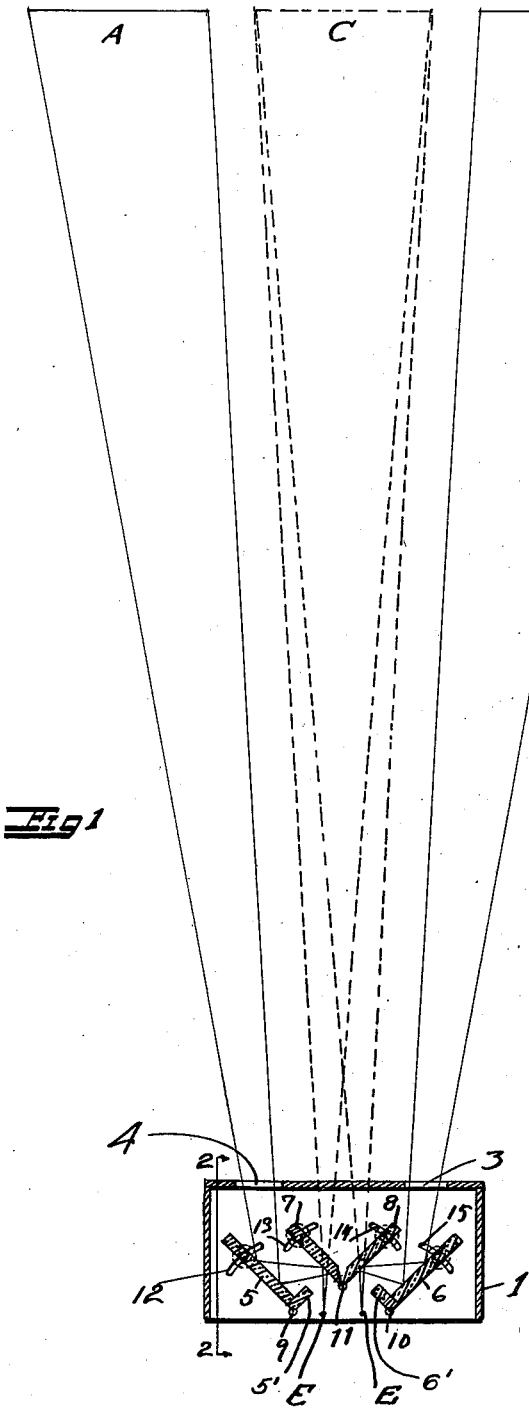
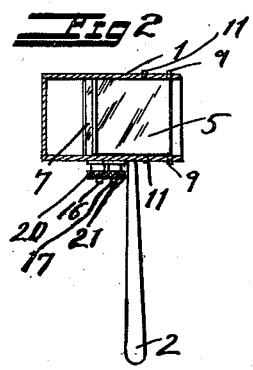
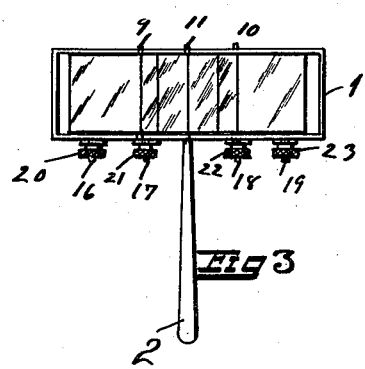
INVENTOR
A. L. Hyde
BY
Carlos P. Griffin
ATTORNEY Patented Feb. 8, 1927.

1,616,857

UNITED STATES PATENT OFFICE.

ARCHIE LEMONT HYDE, OF SANTA CRUZ, CALIFORNIA.

APPARATUS FOR VIEWING PICTURES WITH THE ILLUSION OF RELIEF.

Application filed February 19, 1923. Serial No. 619,822.

This invention relates to an apparatus for viewing pictures with the illusion of relief, and its object is to provide means which will be capable of apparently projecting two given pictures upon each other to accomplish the object.

It will be understood by those skilled in the art that many attempts have been made to show plain pictures in relief but, of course, the only thing that can be done with a plain picture in this line is to deceive the eye and give the illusion of relief instead of actually showing any relief.

In the present instance two series of pictures are used, and the viewing apparatus is arranged to receive impressions from both pictures while bringing them to a common position and thereby give the eye the illusion of relief.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a plan view of the apparatus showing the position of the pictures to be viewed and showing the position of the eyes in looking through the same, Fig. 2 is a vertical sectional view on the line 2—2, Fig. 1, of the apparatus and, Fig. 3 is a view of the apparatus as it appears to the eye.

The apparatus may consist of a rectangular box 1 open at the back and provided with windows 3 and 4 at the front. The box is held in front of the eyes by means of the handle 2. Inside the box there are four mirrors 5 to 8 inclusive. These mirrors are pivotally connected to the box at the pivot points 9, 10 and 11 and they each have depending screws 16 to 19 on their edges, which screws pass through slots 12 to 15 inclusive in the bottom of the box through curved slots.

Knurled nuts 20 to 23 serve to secure the mirrors in any desired adjustment.

The eyes are placed at the position E—E, Fig. 1, whereupon they apparently see a picture at C, which consists of the two pictures A, B superimposed upon each other.

At the back edge of the mirrors 5 and 6 there is a shield 5' 6' to prevent the eyes from being confused by any direct light passing through the windows 3 and 4.

In operation the apparatus is held in front of the eyes for viewing two stereoscopically taken pictures A and B, and the mirrors are arranged to bring those two pictures into the position C, one superimposed upon the other.

While mirrors have been mentioned in this specification as being used for effecting the reflection of the pictures, it will be apparent that prisms may be equally as well used for that purpose, the prisms being arranged so that there will be total reflection from one prism plane to another prism plane whereby precisely the same result is effected in the same way as with mirrors, only with practically no loss of light due to the total reflection.

What I claim is as follows, but modifications may be made in carrying out the invention shown in the drawings and in the above particularly described form thereof, within the purview of the invention.

An apparatus for viewing pictures with illusion of relief, comprising a rectangular box, open at the back and having two spaced windows in the front thereof, a handle on said box, four pivoted mirrors adapted to receive reflections through said windows inside said box, depending screws on said mirrors and extending through curved slots in the bottom of said box, and nuts on said screws to clamp the mirrors in adjusted positions.

In testimony whereof I have hereunto set my hand this 13th day of February A. D. 1923.

ARCHIE LEMONT HYDE.